United States Patent [19]
Gazuit

[11] 3,767,509
[45] Oct. 23, 1973

[54] DRUM FOR MAKING RADIAL TIRE CARCASSES

[76] Inventor: Georges Gazuit, Chenin-Chauveau, Montlucon, France

[22] Filed: Aug. 5, 1971

[21] Appl. No.: 169,287

[30] Foreign Application Priority Data
Feb. 15, 1971  France .............................. 7104994

[52] U.S. Cl. ................. 156/415, 156/133, 156/417, 156/420, 156/421
[51] Int. Cl. ....................... B29h 17/16, B29h 17/22
[58] Field of Search .................... 156/414, 415, 416, 156/417, 420, 400, 421, 133

[56] References Cited
UNITED STATES PATENTS
3,560,301  2/1971  Cantarntti ....................... 156/415 X
FOREIGN PATENTS OR APPLICATIONS
1,038,067  8/1966  Great Britain ...................... 156/400

Primary Examiner—Alfred L. Leavitt
Assistant Examiner—C. B. Cosby
Attorney—Morton Amster et al.

[57] ABSTRACT

In this tire making drum comprising a central hollow shaft having slidably mounted thereon a pair of sockets to which equal crossed arms supporting curved pre-shaping segments covered with elastic lining material are pivoted, and a screw coaxial to said hollow shaft and engaging tapped holes of said sockets, a pair of annular flange units are disposed on either side of the median transverse plane of the drum and carry a bead clamp and means for folding the plies and like tire-making materials about said bead clamp, each curved pre-shaping segment comprises a detachable contour element mounted to a segment support provided with slots each engaged by a slide mounted to one of the arms of said segment support, as well as a pair of lugs adapted to move laterally and adjustably away from each other on either side of said segment support.

8 Claims, 3 Drawing Figures

PATENTED OCT 23 1973 3,767,509

INVENTOR:
GEORGES GAZUIT
BY
Amster Rothstein
ATTORNEYS.

DRUM FOR MAKING RADIAL TIRE CARCASSES

BACKGROUND OF THE INVENTION

The present invention relates in general to the tire-making industry and has specific reference to drums of the type used in machines for making radial tire carcasses, also referred to as radial-ply carcasses.

A known type of tire making drum of this character comprises a hollow shaft having slidably mounted thereon a pair of sockets controlling equal arms crossing each other and supporting pre-shaping segments of adequate outer contour, which are covered with an elastic covering membrane, a screw mounted coaxial and rotatably in said hollow shaft and engaging female screw-threaded holes formed in said sockets, a pair of annular flanges slidably mounted on said hollow shaft and supporting each a bead clamping device and a device for folding the tire-making elements about said bead clamping device, and means for controlling the sliding movements of said pair of flanges on said hollow shaft, the radial movements of said bead clamping device and the pivotal movements of said folding device.

SUMMARY OF THE INVENTION

It is the primary object of the present invention to provide a tire-making drum of the above-mentioned general type, which is intended more particularly for the manufacture of truck tires.

In this tire-making drum, each shaped segment comprises a detachable contour element mounted on a segment supporting member provided with a pair of guide slots each engaged by a slide carried by one of the segments supporting arms, and also with a pair of adjustable lugs adapted to move laterally away from each other, on either side of said segment supporting member.

Other features characterizing this drum will appear as the following description proceeds with reference to the accompanying drawings.

BRIEF DESCRIPTION OF THE DRAWINGS

An exemplary form of embodiment of the drum of this invention is illustrated in the drawings and given by way of illustration. In the drawings.

DESCRIPTION OF THE PREFERRED EMBODIMENT

Figure 1:
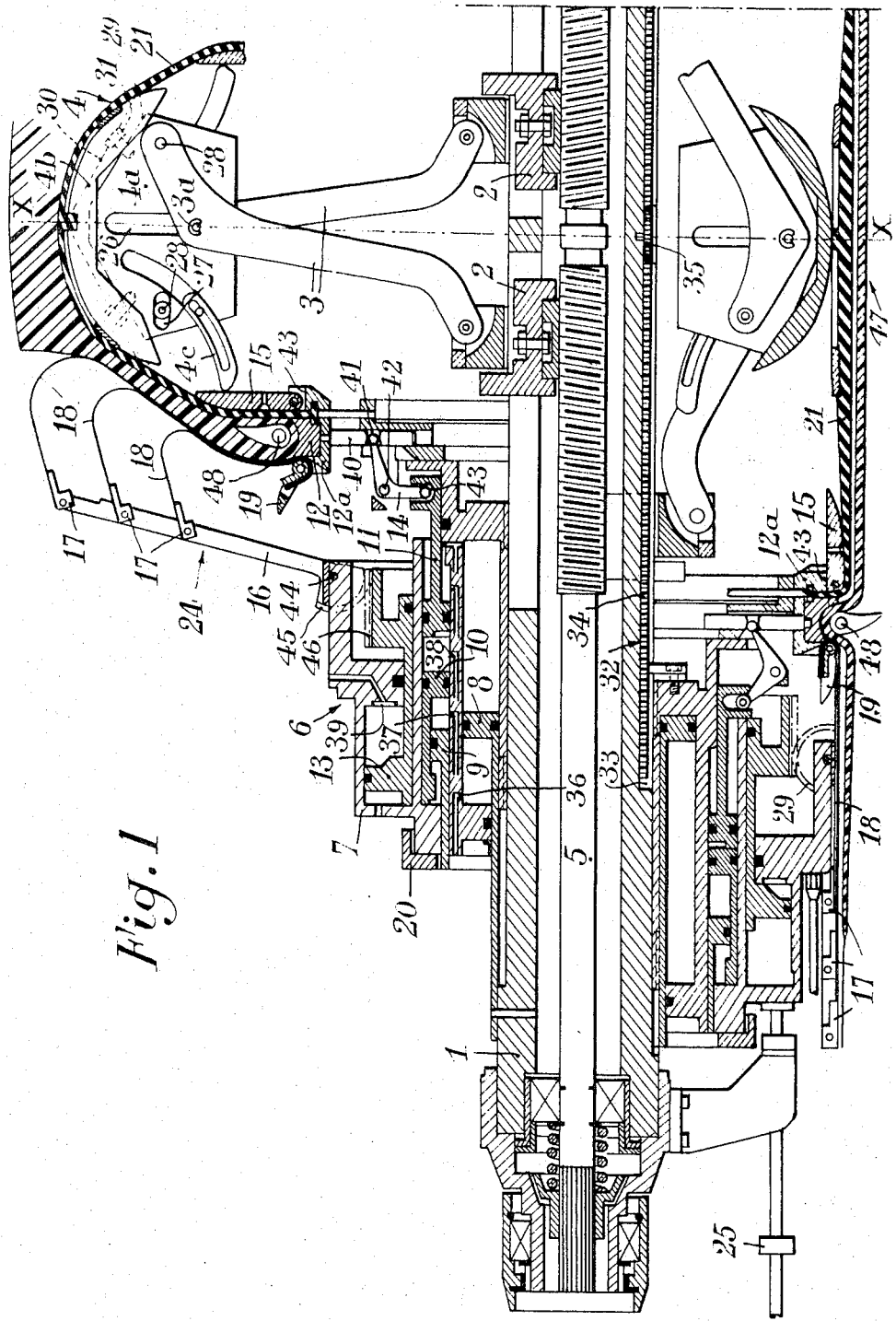
FIG. 1 shows an axial sectional view of the drum, with the component elements thereof in their folded positions in the lower half of the Figure and in their unfolded positions in the upper half; in the lower portion of this figure there are shown the materials for manufacturing the tire which are positioned thereat at the beginning of the actual use of the drum in a tire making operation the upper portion of said figure shows the same materials fully shaped into a tire.
Figure 2:
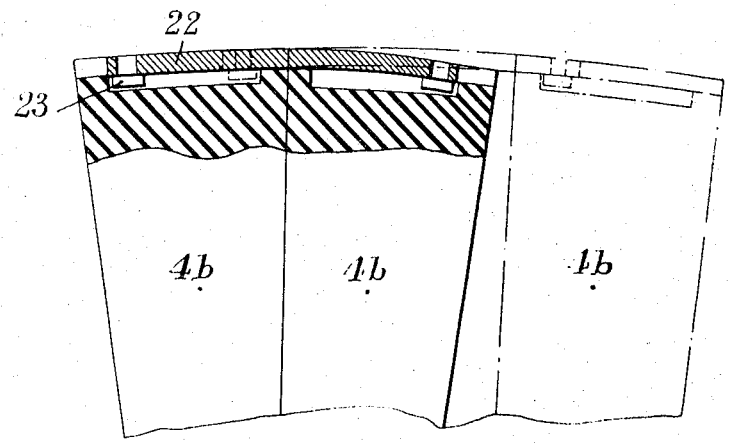
FIGS. 2 and 3 are detail views showing on a larger scale, in fragmentary section taken at right angles to the drum axis and in a corresponding developed external view, respectively, a metal strip covering of the cylindrical peripheral surface of the shaping segments.
Figure 3:
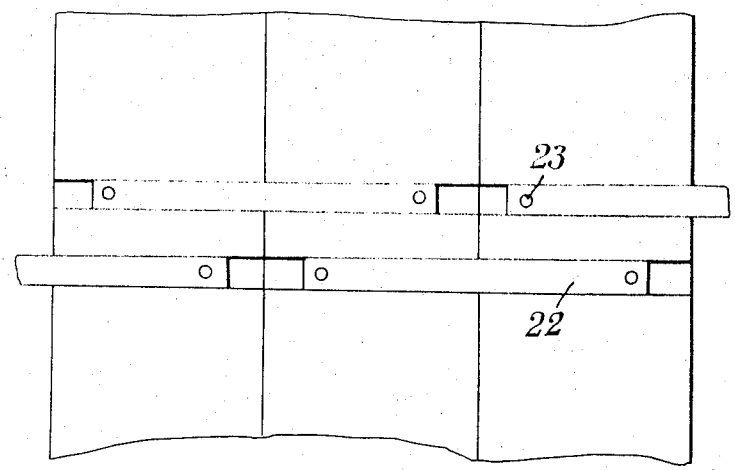

The tire making drum according to the present invention comprises as already known in the art a hollow shaft 1 having slidably mounted thereon a pair of plates 2 controlling a pair of equal arms 3 crossing each other and supporting a pair of pre-shaping segments 4 of suitable outer peripheral contour, which are covered with an elastic covering membrane 21, a screw 5 rotatably and coaxially mounted in said hollow shaft 1 and engaging corresponding internally screw-threaded sockets with opposite pitch 2 rigid with said plates 2, respectively, and a pair of annular flange units 6 slidably mounted on said hollow shaft and disposed on either side of said plates 2, each flange unit supporting a bead clamping device 12.

According to this invention each shaping segment 4 comprises main segment member 4a having formed in its plane of symmetry a rectilinear through slot 26 and, on either side of this first slot, a pair of transverse rectilinear slots 27. The pair of equal arms 3 are pivoted to each other by means of a pin 3a acting between these two arms as a slide engaging said slot 26 and the ends of said arms 3 which are opposed to those pivoted to the pair of plates 2 are pivoted to a pair of slides 28 engaging the transverse slots 27. Thus, a sturdy mounting of the main segment element is obtained so that during its movements this element is properly held in a symmetrical position in relation to the median transverse plane X X of the drum when both plates 2 travel themselves as contemplated, i.e., symmetrically in relation to this plane. This main segment element 4a is completed externally of the drum axis by a detachable profile member or template 4b of which the radial width and external contour correspond to the diameter and profile of the tire to be obtained. In the specific form of embodiment illustrated in the drawing each detachable profile member 4b is provided on its inner contour to be disposed towards the drum axis, with groove 29 adapted to fit on the outer contour of said main segment element 4a and, on its outer contour to be covered with the elastic membrane 21, with other grooves 30 engageable by set screws 31 for fastening the main element 4a.

This main element 4a of the curved segment carries in addition a pair of lugs 4c slidably mounted in this main element and adapted to be set laterally in a position adjustable in the outward direction with respect to the side edges of this main element. The function of these lugs 4c is to cooperate with a pair of corresponding members of the annular flange units 6, as will be explained presently.

An arrangement is provided for maintaining the symmetry of the sliding movements of the hollow shaft 1, and on either side of the median plane X X of the drum, of the pair of annular flanges 6. This arrangement comprises at least one pair of rack bars, of which one is partially visible in the figure. Each bar, such as the bar 32, is secured to one of the annular flanges 6, towards the axis of the hollow shaft 1 and parallel this axis. The rack bar 32 is slidably engaged in a groove 33 machined along one generatrix of the outer cylindrical surface of the hollow shaft 1. Both rack bars face each other with their rack portions 34 engaging with their teeth a common and coplanar pinion 35 pivotally mounted to said hollow shaft 1 in the bottom of said groove 33.

Each annular flange 6 comprises a compound ram cylinder 7 in which three coaxial annular spaces are formed. The first space from the axis of these coaxial annular spaces encloses the head of a piston 8 rigidly secured to the hollow shaft 1 and defining in the outward direction of this shaft a chamber adapted to be supplied with compressed fluid, preferably air, via an inlet port 36. In the second annular space a stop member 9 (of which the position is adjustable by means of an external member 20), a piston 10 and a third piston 11 are slidably mounted from the end of said hollow shaft and towards the transverse median plane X X of the drum. The function of said stop member 9 is to adjustably limit the permissible stroke of piston 10 under the influence of the compressed fluid introduced through an inlet port 37. The piston 11 is adapted to protrude externally of the annular flange 6 towards the transverse median plane X X under the influence of compressed fluid fed through another inlet port 38. Finally, in the third annular space a piston 13 is slidably mounted and adapted to penetrate into the annular flange 6 backwards in relation to the median transverse plane X X under the influence of compressed fluid fed through another inlet port 39.

Each element of the bead clamp 12 is rigid with a support 12a carried by a rod 40 mounted for vertical sliding movement in the end of said annular flange 6 which faces said median transverse plane X X. This rod 40 has formed therein a groove 41 engageable by the end of a bell-crank lever 14 pivoted to a pin 42 rigid with the annular flange 6 and having its opposite end engaged in a notch 43 cut in the output end of piston 11. The elements 12 and 12a are adapted to clamp the edges of the elastic coating membrane 21 therebetween and furthermore they are shaped to accommodate the T-shaped profile of these edges. The bead supporting element 12a is shaped against the inner surface of the membrane 21 into a strap having pivoted therein a lever 15 for which it provides a bearing surface 43 parallel to the axis of said hollow shaft 1. In the collapsed drum condition illustrated in the lower portion of FIG. 1 the elastic membrane 21 is cylindrical and holds the lever 15 in proper contact with the bearing surface 43 of element 12a and therefore in a direction parallel to the axis of said hollow shaft 1.

The device 24 for folding the tire making elements along the sides of the covering membrane 21 comprises an arm 16 pvioted on an axle 44 rigid with the compound cylinder structure 7 through its toothed sector-shaped 45 portion meshing with a rack 46 cut in the rod of piston 13 housed in the third annular chamber of this compound cylinder structure and having pivoted thereon short levers 17 each attached to one end of an elastic blade 18 having its opposite end rigidly engaged between the corresponding bead clamp 12 and its support 12a. In the collapsed drum position, illustrated in the right-hand lower portion of FIG. 1, the arm 16 and the short levers 17 are aligned in a position parallel to the drum axis and the blades 18 are superimposed to one another and to the arm 16 in this alignment. As the drum expands towards its tire making position (upper portion of FIG. 1) and due to the directing action produced at the beginning of this movement, by a small lever 19 which is urged towards the median plane X—X and away from the axis by the bead clamp 12 and its support 12a and itself urges in the same direction the parts of the blades adjacent to their ends clamped between clamp and support. The end of the folding action is illustrated in the upper portion of FIG. 1 which shows the tire making elements assembled in the shape of a tire. The membrane 21, according to the invention, bears on the detachable contour elements 4b of shaping segments 4 through the medium of metal blades 22 fitted in circular series in the substantially toroidal periphery of the set of detachable contour elements. To this end each detachable contour element 4b has formed in one portion of its width a plurality of transverse grooves and square tenons 23 are secured under each end of the blades 22 whereby this blade fits in the two ends of the set of grooves adjacent to the detachable contour elements 4b covered by this blade. The gaps formed between successive blades of a circular set of blades register with a blade of each one of the two circular series of adjacent blades.

This tire making drum operates as follows:

Assuming the drum to be in its "flat," contracted or retracted position i.e., at the reduced diameter necessary for extracting it from the finished tire as shown in the lower portion of FIG. 1, the assembly is expanded to its intermediate diameter by supplying compressed air to the chamber located on the left-hand side of piston 10. This piston 10 moves forwards as permitted by the adjustable stop member 20 and during this movement it drives the piston 11 acting upon the bell-crank levers 14 so as to move radially outwards the bead clamps 12 to which the membrane 21 is secured. During this movement the screw 5 rotates through the number of revolutions necessary for bringing the segments 4 to the level of said bead clamps 12. The drum width is maintained as in the folded condition by the high-pressure compressed air fed to the chamber disposed on the left-hand side of piston 8. Then it is possible to dispose on the cylindrical drum having the new, selected diameter, the various elements necessary for making the tire comprising sheat elements 47 and the two annular beads 48. The bead clamps 12 are subsequently moved to their radial positions as shown in the upper portion of FIG. 1 by supplying fluid under pressure to the cylinder between pistons 10 and 11, the curvature being obtained by actuating the screw 5.

Under these conditions, the segments 4 are driving and pull the bead clamping flange means 12 of which the high holding pressure exerted on piston 8 was changed to a low pressure in order to maintain a proper pressure during the operation. During the shaping operation, the levers 15 were raised by the adjustable lugs 4a. Reversing the fluid supply about piston 8 permits of ascertaining that the two flange units 6 properly brought their abutment member 25 in contact with the fixed support.

After the various materials necessary for the tire-making operation have been properly disposed on the drum periphery, the plies are raised by supplying fluid to the chamber located on the right-hand side of piston 13.

By effecting a reverse sequence of operations the raising means resume their positions parallel to the drum axis, and the straightening and bead releasing operations may then be performed until the contracted position is obtained again to permit an easy removal of the tire.

Of course, various modifications may be brought to the specific form of embodiment shown and illustrated herein without departing from the basic principles of the invention as set forth in the appended claims.

What I claim is:

1. Tire making drum comprising a hollow shaft, a pair of internally screw-threaded sockets slidably mounted on said hollow shaft, equal arms responsive to said sockets and crossing each other, curved pre-shaping curved segments supported by said arms and an elastic membrane covering said segments, a screw-mounted coaxially and rotatably in said hollow shaft and engaging the internally screw-threaded passages of said sockets, a pair of annular flange units slidably mounted on said hollow shaft and disposed on either side of said sockets, a bead clamp, a device for folding the elements of material for making the tire about said bead clamp, and means for controlling the sliding movements of said flange units along said hollow shaft, the radial movements of said bead clamp and the pivotal movements of said folding device, said means being carried by each one of said pair of flange units, wherein each curved pre-shaping segment consists of a main segment element having formed in its plane of symmetry a median rectilinear slot and, on either side of this first slot, two other transverse rectilinear slots, the two equal arms being pivoted to each other by means of a pivot pin acting between these two arms as a slide engaging said median slot whereas the arm ends opposed to those pivoted to said sockets are pivotally mounted to slides engaging said transverse rectilinear slots, said main segment element being provided with a pair of lugs adapted to be moved laterally away from each other, on either side of said segment support, and a detachable contour element mounted to said segment support.

2. Tire-making drum as set forth in claim 1, wherein a lever is pivotally mounted to the bead clamp and adapted to be pivoted towards the median transverse plane of the drum and to remain parallel to the drum axis as long as said lever is not pushed in the direction away from said drum axis during the drum expansion by the registering one of the pair of lugs adjustably carried by the segment support.

3. Tire making drum as set forth in claim 1, wherein metal blades are fitted to constitute circular series in the substantially toroidal periphery of the set of detachable contour elements, said blades acting as supports to the elastic covering membrane.

4. Tire making drum as set forth in claim 1, wherein square tenons are mounted beneath each end of the blades and adapted to fit into the ends of transverse grooves cut in one portion of the width of each detachable contour element.

5. Tire making drum as set forth in claim 1, wherein each annular flange unit comprises a compound cylinder structure in which three coaxial annular chambers are formed, a piston rigidly supported by said hollow shaft and slidably fitted in a first annular chamber, and three other pistons slidably fitted in the second annular chamber, with one of these pistons adapted to drive through its rod extending towards the median transverse plane of the drum the radial movements of the bead clamp, and a fifth piston slidably fitted in the third annular chamber and of which the rod directed towards said median, transverse plane of the drum is adapted to control the pivotal movements of the device for holding the tire making materials within the bead clamp.

6. Tire making drum as set forth in claim 2, wherein a rack is carried by each one of said annular flange units, and a pinion rigid with said hollow shaft and meshing with said rack.

7. Tire-making drum as set forth in claim 5, wherein a rod is formed with an intermediate notch and mounted for vertical sliding movement in the end of each annular flange unit which is adjacent to the median transverse plane of the drum, said rod supporting the bead clamp, a pivot pin mounted to the same end and a bell-crank lever fulcrumed to said pivot pin and having one arm engaged in a notch cut in the end of the rod of the piston slidably fitted in the second annular chamber of said compound cylinder structure and its other arm engaged in the notch of said vertical sliding rod.

8. Tire making drum as set forth in claim 1, wherein the device provided in the bead clamp for folding the tire making materials comprises an arm pivoted to the body of said compound cylinder structure through its heel having the configuration of a toothed sector, a rack cut along the rod of the piston slidably fitted in the third annular chamber of said compound cylinder structure and meshing with said toothed sector, and a series of short levers each pivoted to said arm and attached to one end of an elastic blade having its other end rigidly engaged in the corresponding bead clamp.

* * * * *